Patented Dec. 27, 1949

2,492,827

UNITED STATES PATENT OFFICE 2,492,827

HYDROXYCYANOTHIOPHANE CARBOXYLIC ACIDS AND ESTERS AND METHOD OF PREPARING SAME

Bernard R. Baker, Nanuet, N. Y., assignor, by mesne assignments, to American Cyanamid Company, New York, N. Y., a corporation of Maine No Drawing. Application June 21, 1945, Serial No. 600,829

9 Claims. (Cl. 260—329)

The present invention relates to new organic compounds and methods of preparing the same. More particularly, it relates to hydroxythiophane carboxylic acids and esters thereof.

The novel compounds may be illustrated by the following general formula:

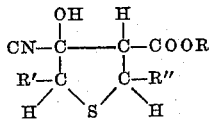

wherein R is hydrogen, alkyl or salt forming radical and R' and R" are hydrogen, alkyl, phenoxyalkyl, carboxy, carboxyalkyl and carbalkoxyalkyl radicals. When in the above general formula either R' or R" or both are phenoxyalkyl I intend to include substituted phenoxyalkyls such as, chlorophenoxyalkyls, bromophenoxyalkyls, nitrophenoxyalkls, etc.

I prepare the compounds of the present invention in accordance with the following general equation:

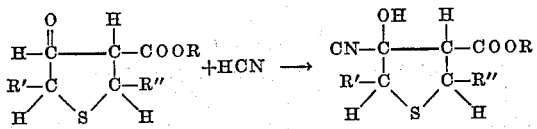

wherein R, R' and R" are as above. This reaction appears to be catalyzed by an alkali metal, ammonium or amine salt of hydrocyanic acid. The catalyst may be introduced into the reaction mixture as such or may be formed therein by the addition of an alkali metal hydroxide such as sodium or potassium hydroxide; ammonium hydroxide; or an amine such as ethanol amine, diethanol amine, diethyl amine, dibutyl amine, or quaternary ammonium compounds such as trimethyl benzyl ammonium hydroxide, ethyl dimethyl benzyl ammonium hydroxide, and the like. These latter substances are believed to react with the liquid hydrogen cyanide to form a salt of hydrogen cyanide which then serves as catalyst for the reaction.

The ketothiophanes used as intermediates in my invention are prepared by condensing a thio acid ester with an unsaturated mono or dicarboxylic acid ester as described in my copending application Serial No. 600,830, filed June 21, 1945, now Patent No. 2,475,580.

A large number of ketothiophanes can be used as intermediates. Among these may be specifically mentioned: 2-propyl - 3 - carbomethoxy-4-ketothiophane, 2 - methyl - 3 - carbomethoxy-4-ketothiophane, 2-propyl-3-carbethoxy - 4 - ketothiophane, 2-phenoxypropyl - 3 - keto-4-carbethoxythiophane, 2-phenoxyethyl - 3 - keto-4-carbomethoxythiophane, 2,3 - dicarbomethoxy-4-ketothiophane, 2,3 - dicarbethoxy - 4 - ketothiophane, 2 - chlorophenoxypropyl-3-carbomethoxy-4-ketothiophane, 2-chlorophenoxypropyl-3-carbethoxy-4-ketothiophane, 2 - (δ - carbomethoxybutyl) -3- carbomethoxy-4-ketothiophane, 2-(δ-carbethoxybutyl) -3-keto-4-carbethoxythiophane, and the like.

The compounds of the present invention are generally viscous oily liquids, varying in color from yellow to brown.

In carrying out the present invention I mix the ketothiophane with liquid hydrogen cyanide at a temperature of from about 0° C. to about 25° C. followed by the addition of the catalyst, or an alkali metal hydroxide, ammonium hydroxide or amine which forms the catalyst in the reaction mixture. The mixture is maintained at a temperature of from 0° C. to about 25° C. for from about 1 hour to about 20 hours.

If desired, a solvent may be used to dilute the reaction mixture. I can use solvent such as methanol, ethanol, propanol, dioxane, etc. When the reaction is complete the mixture is acidified with a mineral acid, and distilled to obtain the desired product. The product obtained at this point is usually of sufficient purity to be used as an intermediate, but if greater purity is desired the product may be redistilled.

In order that the nature of the invention may become more apparent the following compounds are among those that may be prepared by the process described herein and are listed as falling within the scope of the present invention: 2 - propyl-3-carbethoxy-4-hydroxy-4-cyanothiophane, 2-propyl-3-carbomethoxy - 4 - hydroxy-4-cyanothiophane, 2 - propyl - 3 - carbopropoxy-4-hydroxy-4-cyanothiophane, 2-propyl-3-hydroxy-3-cyano-4-carbomethoxythiophane, 2 - propyl-3-hydroxy - 3 - cyano - 4 - carbethoxythiophane, 2-propyl-3-hydroxy-3-cyano-4 - carbopropoxythiophane, 2-phenoxypropyl - 3 - carbethoxy - 4 - hydroxy - 4 - cyanothiophane, 2 - phenoxypropyl-3- carbomethoxy-4-hydroxy-4-cyanothiophane, 2-phenoxypropyl-3-carbopropoxy-4-hydroxy-4-cyanothiophane, 2-phenoxypropyl-3-hydroxy-3-cyano-4-carbomethoxy-thiophane, 2-chlorophenoxypropyl-3-carboxy-4-hydroxy-4-cyanothiophane, 2-chlorophenoxypropyl-3-carbethoxy-4-hydroxy-4-cyanothiophane, 2-chlorophenoxy-propyl-3-carbomethoxy-4-hydroxy-4-cyanothiophane, 2-(δ-carbethoxybutyl)-3-hydroxy-3-cyano-4-carbethoxy-thiophane, 2-(δ-carbomethoxybutyl)-3-carbomethoxy-4-hydroxy-4-cyanothiophane, and the like.

The compounds of the present invention are useful in the preparation of antivitamins and vitamins such as biotin.

The following specific examples are for the purpose of illustrating the invention in greater particularity but are not intended to limit the invention to the reactants and conditions shown therein.

*Example 1*

To the dry sodium ethylate from 5.8 g. of sodium obtained by evaporating the alcoholic solution to dryness in vacuo was added in a nitrogen atmosphere 27.5 g. of ethyl thioglycolate in 50 cc. of benzene followed by 33.6 g. of ethyl 2-hexenoate in 25 cc. of benzene. After being refluxed for three hours the solution was extracted with ice water and iced 3% sodium hydroxide. The aqueous extracts were acidified and extracted with benzene. Distillation gave 33.5 g. (68%) of 2-propyl-3-carbethoxy-4-ketothiophane, as an oil, boiling point 109° to 111° C. (1 mm.).

To a mixture of 6 cc. of hydrogen cyanide and 21.6 g. of 2-propyl-3-carbethoxy-4-ketothiophane cooled to 0° C. was added four drops of 50% potassium hydroxide. After twenty hours at about 0° C., the mixture was acidified with sulfuric acid and distilled from potassium bisulfate. On redistillation 19 g. (78%) of 2-propyl-3-carbethoxy-4-hydroxy-4-cyanothiophane having a boiling point of 135°–139° C. (1 mm.) was obtained.

*Example 2*

To 18 cc. of liquid hydrogen cyanide and 0.18 cc. of 50% potassium hydroxide cooled in an ice bath was added 54 g. of 2-propyl-3-carbomethoxy-4-ketothiophane in portions so that the temperature was 10°–15° C. After 12 hours at about 0° C., the mixture was acidified with a 0.4 cc. of 85% phosphoric acid and distilled. A yield of 57 g. (94%) of 2-propyl-3-carbomethoxy-4-hydroxy-4-cyanothiophane having a boiling point of 139°–142° C. (1 mm.) was obtained.

*Example 3*

To the dry sodium methylate from 2 g. of sodium obtained by evaporating its methanolic solution to dryness in vacuo was added 7 g. of methyl thioglycolate and 13.6 g. of methyl 6-phenoxy-2-hexenoate in 50 cc. of benzene. After being refluxed for two and one-half hours, the solution was extracted with ice water and iced 3% sodium hydroxide. Acidification gave an oil which was extracted with benzene, washed with water and evaporated to dryness in vacuo. The product 2-(γ-phenoxypropyl)-3-carbomethoxy-4-ketothiophane, was obtained as an orange oil, yield 14.7 g. (81%).

To a mixture of 20 g. of 2-(γ-phenoxypropyl)-3-carbomethoxy-4-ketothiophane, 30 cc. of methanol and 20 cc. of liquid hydrogen cyanide cooled in an ice bath was added 0.3 cc. of 50% aqueous potassium hydroxide. After two hours at 0° and eighteen hours at 10°–15° C., the solution was acidified with 1 cc. of 85% phosphoric acid. After the volatile material had been removed in vacuo a yield of 26 g. of 2-(γ-phenoxypropyl)-3-carbomethoxy-4-hydroxy-4-cyanothiophane was obtained.

*Example 4*

To a mixture of 13.5 g. of 2-(γ-phenoxypropyl)-3-carbomethoxy-4-ketothiophane and 19 cc. of hydrogen cyanide cooled in an ice bath was added 0.1 cc. of 50% potassium hydroxide. After sixteen hours at about 0° C. the mixture was acidified with 0.2 cc. of 85% phosphoric acid and volatile material removed in vacuo. A yield of 16 g. of 2-(γ-phenoxypropyl)-3-carbomethoxy-4-hydroxy-4-cyanothiophane was obtained.

*Example 5*

To a mixture of 22 g. of 2-(γ-phenoxypropyl)-3-keto-4-carbomethoxythiophane and 20 cc. of liquid hydrogen cyanide cooled in an ice bath was added 0.2 cc. of 50% potassium hydroxide. The temperature rose to 15° C. After sixteen hours at 0° C., the mixture was acidified with 0.6 cc. of 85% phosphoric acid and the excess hydrogen cyanide removed in vacuo through an aqueous potassium hydroxide trap. The product, 2-(γ-phenoxypropyl)-3-hydroxy-3-cyano-4-carbomethoxythiophane, was obtained in quantitative yield as an orange-brown oil.

*Example 6*

From 15.5 g. of methyl 2-mercapto-5-chlorophenoxyvalerate, 8 cc. of methyl acrylate and the dry sodium methylate from 1.2 g. of sodium was obtained 14.7 g. of 2-(γ-chlorophenoxypropyl)-3-keto-4-carbomethoxythiophane.

To a mixture of 14.3 g. of 2-(γ-chlorophenoxypropyl)-3-keto-4-carbomethoxythiophane, 15 cc. of methanol and 10 cc. of liquid hydrogen cyanide cooled in an ice bath was added 0.2 cc. of 50% potassium hydroxide. After being swirled for about five minutes the mixture was homogeneous. A quantitative yield of 2-(γ-chlorophenoxypropyl)-3-hydroxy-3-cyano-4-carbomethoxythiophane was obtained by the work-up described in Example 5.

*Example 7*

To a mixture of 55 g. of 2-(δ-carbomethoxybutyl)-3-keto-4-carbomethoxythiophane and 20 cc. of liquid hydrogen cyanide at 0° C. was added 0.3 cc. of 50% aqueous potassium hydroxide. After sixteen hours at 0° C. the mixture was acidified with 1 cc. of 85% phosphoric acid and volatile material removed in vacuo, and finally at 100° C. The product was obtained as a nearly colorless oil which partially crystallized on cooling. The yield of 2-(δ-carbomethoxybutyl)-3-hydroxy-3-cyano-4-carbomethoxythiophane was quantitative.

*Example 8*

To a mixture of 8.5 g. of 2-(δ-carbethoxybutyl)-3-carbethoxy-4-ketothiophane and 5 cc. of hydrogen cyanide was added 0.05 cc. of 50% potassium hydroxide. After 15 hours at 0° C. the mixture was acidified with 0.2 cc. of 85% phosphoric acid and evaporated to dryness in vacuo. A yield of 9.1 g. (98%) of 2-(δ-carbethoxybutyl)-3-carbethoxy-4-hydroxy-4-cyanothiophane was obtained as an oil.

In a second run identical with the above 34.8 g. of the keto ester gave 38.5 g. of cyanohydrin.

Example 9

To a mixture of 21.2 g. of 2-carbomethoxymethyl-3-carbomethoxy-4-ketothiophane and 8.0 cc. of liquid hydrogen cyanide cooled in an ice bath was added 0.1 cc. of 50% potassium hydroxide. After sixteen hours at 0° C. the mixture was acidified with 0.4 cc. of 85% phosphoric acid. Removal of the excess hydrogen cyanide in vacuo gave 23.5 g. (99%) of 2-carbomethoxymethyl-3-carbomethoxy-4-cyano-4-hydroxy-thiophane.

I claim:

1. Chemical compounds in accordance with the following formula:

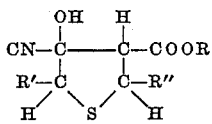

wherein R is a member of the group consisting of hydrogen and alkyl radicals, and R' and R'' are members of a group consisting of hydrogen, alkyl, phenoxyalkyl, carboxy, carboxyalkyl and carbalkoxyalkyl.

2. 2-(delta-carbethoxybutyl)-3-carbethoxy-4-hydroxy-4-cyanothiophane.

3. 2-(delta-carbomethoxybutyl)-3-hydroxy-3-cyano-4-carbomethoxythiophane.

4. A method of preparing compounds corresponding to the general formula

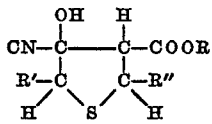

wherein R is a member of the group consisting of hydrogen and alkyl radicals, and R' and R'' are members of a group consisting of hydrogen, alkyl, phenoxyalkyl, carboxy, carboxyalkyl and carbalkoxyalkyl, which comprises mixing a compound having the general formula

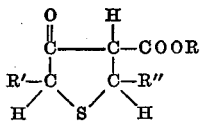

wherein R, R' and R'' are as defined above, with hydrogen cyanide in the presence of an alkaline salt of hydrocyanic acid.

5. A method of preparing 2-(delta-carbethoxybutyl)-3-carbethoxy-4-hydroxy-4-cyanothiophane which comprises mixing 2-(delta-carbethoxybutyl)-3-carbethoxy-4-ketothiophane with hydrogen cyanide in the presence of an alkaline salt of hydrocyanic acid.

6. A method of preparing 2-(delta-carbomethoxybutyl)-3-hydroxy-3-cyano-4-carbomethoxythiophane which comprises mixing 2-(delta-carbomethoxybutyl)3-keto-4-carbomethoxythiophane with hydrogen cyanide in the presence of an alkaline salt of hydrocyanic acid.

7. 2-(delta-carboxybutyl)-3-carboxy-4-hydroxy-4-cyanothiophane.

8. Chemical compounds in accordance with the following formula:

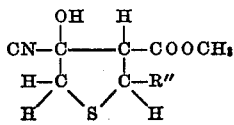

wherein R'' is a carbaloxyalkyl radical.

9. Chemical compounds in accordance with the following formula:

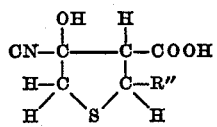

wherein R'' is a carboxyalkyl radical.

BERNARD R. BAKER.

No references cited.